United States Patent
Bigman et al.

(10) Patent No.: US 10,108,645 B1
(45) Date of Patent: Oct. 23, 2018

(54) DATABASE MONITORING FOR ONLINE MIGRATION OPTIMIZATION

(71) Applicant: EMC Corporation, Hopkinton, MA (US)

(72) Inventors: Ron Bigman, Holon (IL); Jehuda Shemer, Kfar Saba (IL); Amit Lieberman, Raanana (IL); Assaf Natanzon, Tel Aviv (IL); Yana Vaisman, Netanya (IL); Oded Peer, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 330 days.

(21) Appl. No.: 14/984,281

(22) Filed: Dec. 30, 2015

(51) Int. Cl.
*G06F 7/00* (2006.01)
*G06F 17/30* (2006.01)

(52) U.S. Cl.
CPC ...... *G06F 17/303* (2013.01); *G06F 17/30318* (2013.01); *G06F 17/30578* (2013.01)

(58) Field of Classification Search
CPC ......... G06F 17/30584; G06F 17/30575; G06F 17/30486; G06F 17/303
See application file for complete search history.

(56) References Cited

U.S. PATENT DOCUMENTS

| | | | | |
|---|---|---|---|---|
| 6,052,694 A * | 4/2000 | Bromberg | ........... | G06F 11/3409 707/200 |
| 2014/0244642 A1* | 8/2014 | Yogev | ............... | G06F 17/30584 707/737 |
| 2015/0149509 A1* | 5/2015 | Leu | ................... | G06F 17/30575 707/803 |
| 2015/0269239 A1* | 9/2015 | Swift | ................ | G06F 17/30584 707/610 |
| 2015/0347559 A1* | 12/2015 | Elias | ................. | G06F 17/30584 707/737 |

* cited by examiner

*Primary Examiner* — Marc S Somers
(74) *Attorney, Agent, or Firm* — Chamberlain, Hrdlicka, White, Williams, & Aughtry

(57) ABSTRACT

In general, the invention relates to a method and system for migrating tables in databases. The method may include calculating a first plurality of migration factors for a first set of tables in a source database using a plurality of pre-calculated factors and a first plurality of dynamically-calculated factor, where each of the first plurality of migration factors is associated with one of the first set of tables. The method may further include selecting a first table from the first set of tables to migrate based on the first plurality of migration factors; and migrating the first table to a target database.

12 Claims, 12 Drawing Sheets

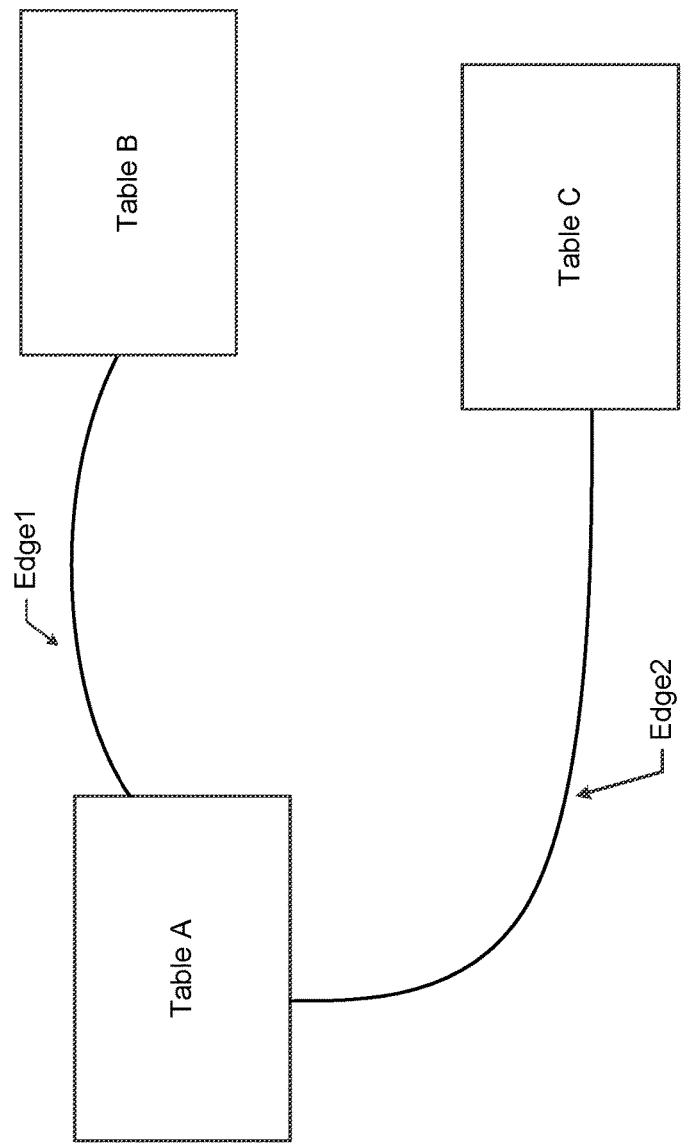
FIG. 2.1

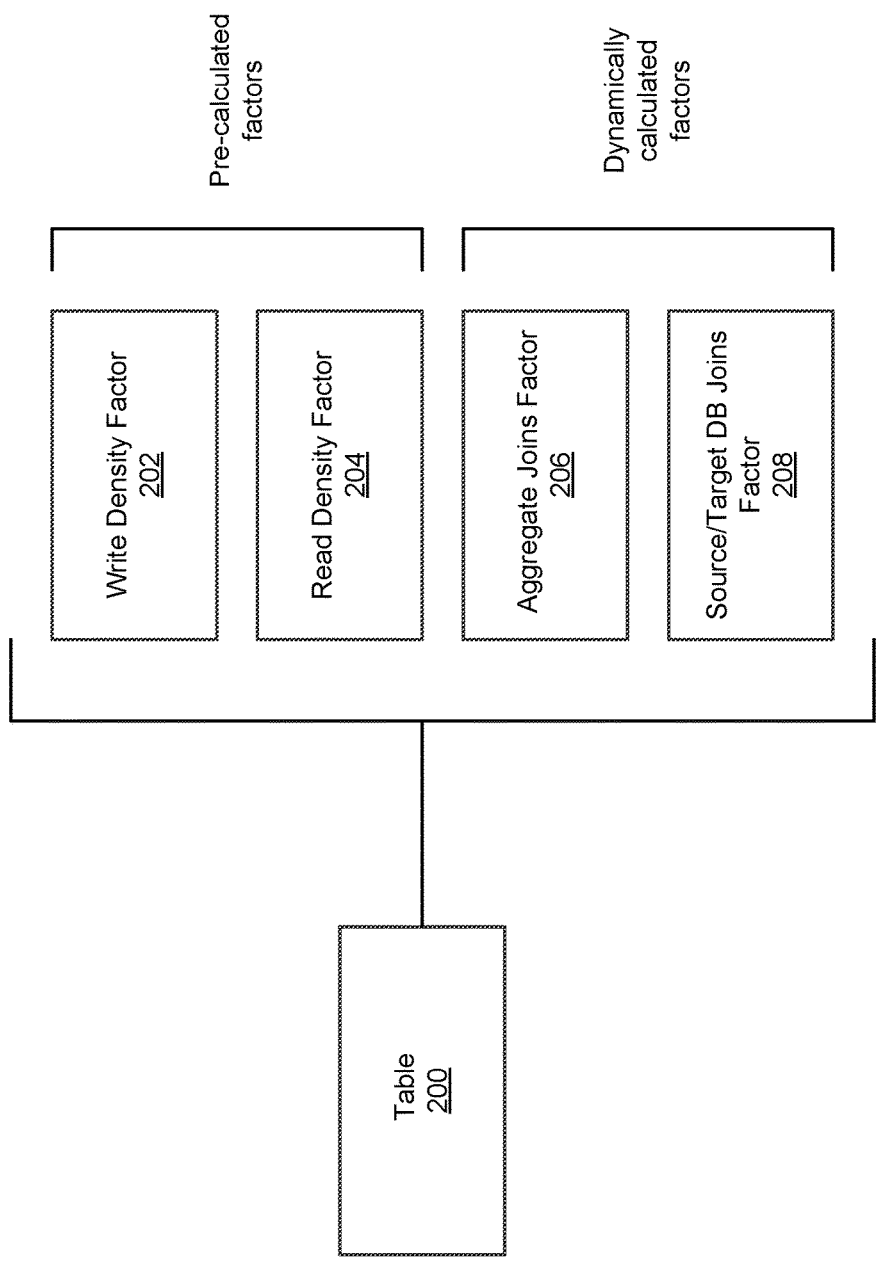
FIG. 2.2

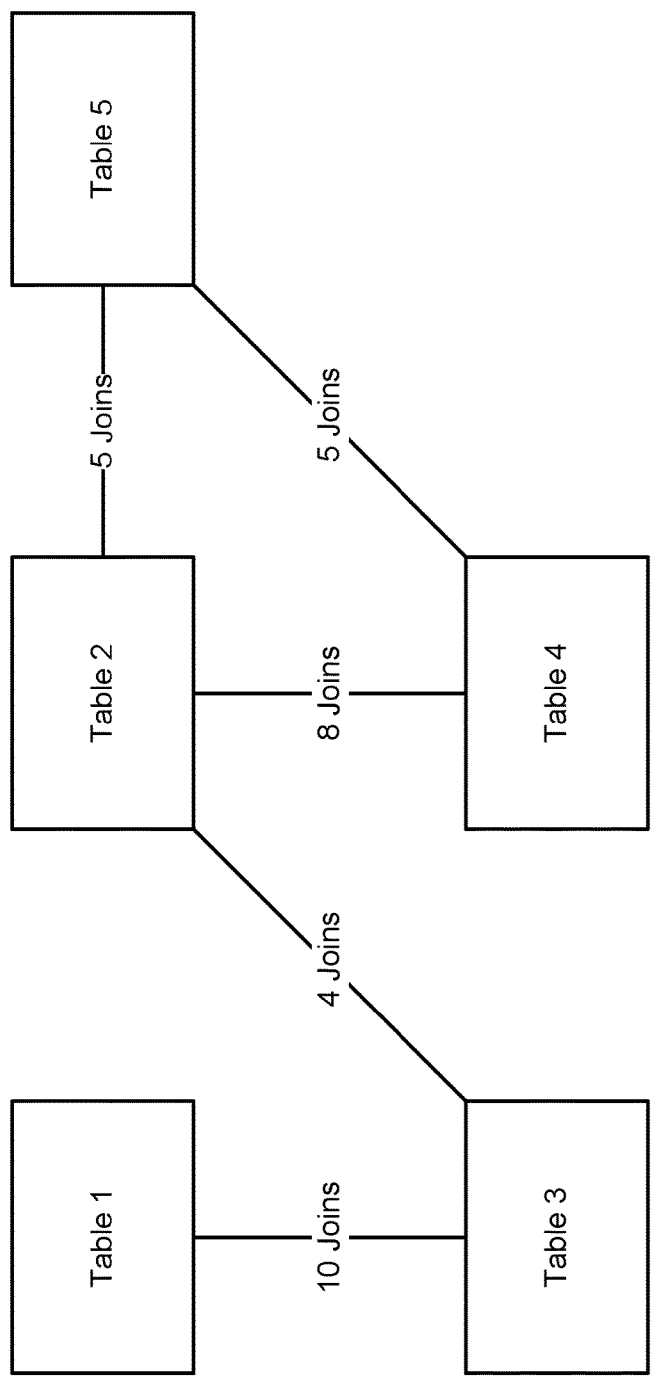
FIG. 4.1

| Table | Size | Writes | Reads |
|---|---|---|---|
| 1 | 500 | 50 | 50 |
| 2 | 800 | 40 | 40 |
| 3 | 200 | 40 | 40 |
| 4 | 100 | 20 | 5 |
| 5 | 400 | 80 | 80 |

FIG. 4.2

| Table | Write Density Factor | Read Density Factor | Agg. Joins Factor | Source/Target DB Joins Factor |
|---|---|---|---|---|
| 1 | 10 | 10 | 10 | 0 |
| 2 | 20 | 10 | 17 | 0 |
| 3 | 5 | 5 | 14 | 0 |
| 4 | 5 | 20 | 13 | 0 |
| 5 | 5 | 5 | 10 | 0 |

FIG. 4.3

| Table | Write Density Factor | Read Density Factor | Agg. Joins Factor | Source/Target DB Joins Factor |      |
|-------|---------------------|---------------------|-------------------|------------------------------|------|
| 1     | 10                  | 10                  | 10                | 0                            |      |
| 2     | 20                  | 10                  | 17                | 17                           | Migrated |
| 3     | 5                   | 5                   | 14                | 4                            |      |
| 4     | 5                   | 20                  | 13                | 8                            |      |
| 5     | 5                   | 5                   | 10                | 5                            |      |

FIG. 4.4

| Table | Write Density Factor | Read Density Factor | Agg. Joins Factor | Source/Target DB Joins Factor | |
|---|---|---|---|---|---|
| 1 | 10 | 10 | 10 | 0 | |
| 2 | 20 | 10 | 17 | 17 | Migrated |
| 3 | 5 | 5 | 14 | 4 | |
| 4 | 5 | 20 | 13 | 13 | Migrated |
| 5 | 5 | 5 | 10 | 10 | |

FIG. 4.5

| Table | Write Density Factor | Read Density Factor | Agg. Joins Factor | Source/Target DB Joins Factor | |
|---|---|---|---|---|---|
| 1 | 10 | 10 | 10 | 0 | |
| 2 | 20 | 10 | 17 | 17 | Migrated |
| 3 | 5 | 5 | 14 | 4 | |
| 4 | 5 | 20 | 13 | 13 | Migrated |
| 5 | 5 | 5 | 10 | 10 | Migrated |

FIG. 4.6

| Table | Write Density Factor | Read Density Factor | Agg. Joins Factor | Source/Target DB Joins Factor | |
|---|---|---|---|---|---|
| 1 | 10 | 10 | 10 | 10 | |
| 2 | 20 | 10 | 17 | 17 | Migrated |
| 3 | 5 | 5 | 14 | 14 | Migrated |
| 4 | 5 | 20 | 13 | 13 | Migrated |
| 5 | 5 | 5 | 10 | 10 | Migrated |

FIG. 4.7

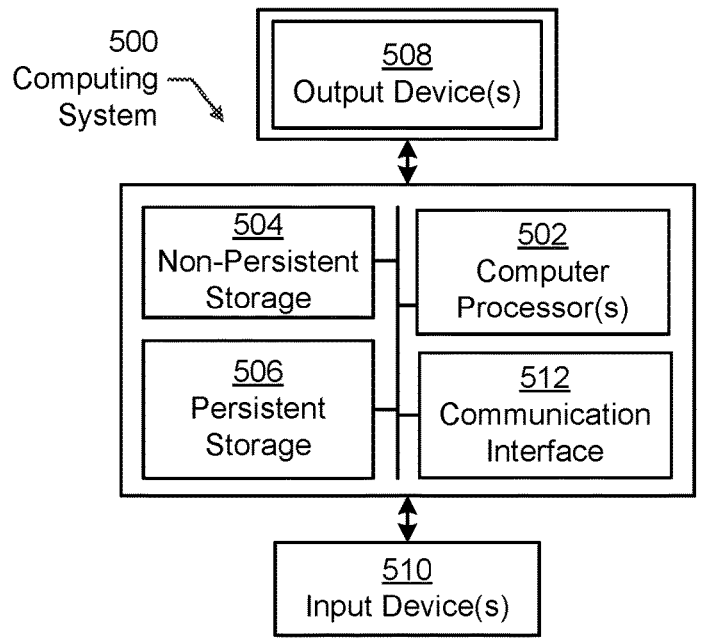
*FIG. 5.1*
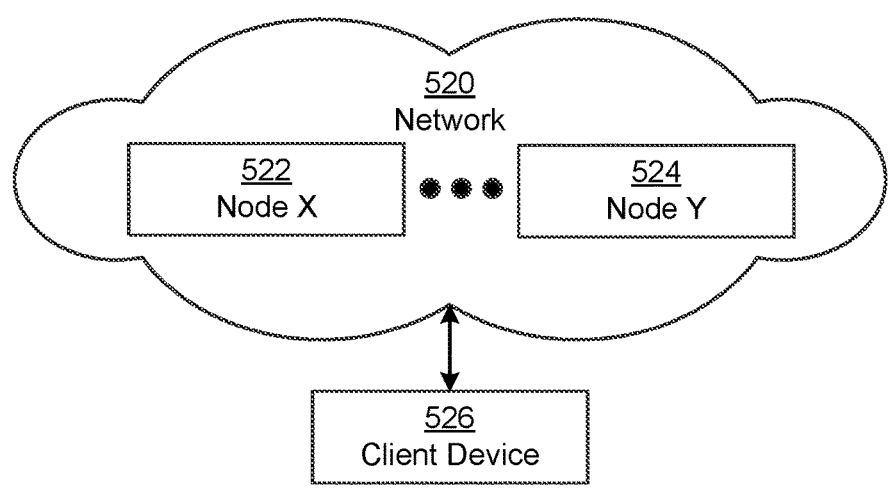
*FIG. 5.2*

DATABASE MONITORING FOR ONLINE MIGRATION OPTIMIZATION

BACKGROUND

Databases are prevalent in computing systems to manage large volumes of data. A database is a collection of tables or other structured elements that organize and store data. Queries, in the form of search requests that may combine data from one or more tables, are transmitted to a server managing the database and processes the data. For large volumes of data, the database may span multiple servers. Traditional approaches to managing data stored in databases are limited to management driven by human administrators.

BRIEF DESCRIPTION OF DRAWINGS

FIG. 2.1 shows example tables in accordance with one or more embodiments of the technology.

FIG. 2.2 shows various pre-calculated and dynamically calculated factors in accordance with one or more embodiments of the technology.

FIGS. 4.1-4.7 show an example in accordance with one or more embodiments of the technology.

FIGS. 5.1 and 5.2 show a computing system in accordance with one or more embodiments of the technology.

DETAILED DESCRIPTION

Figure 1:
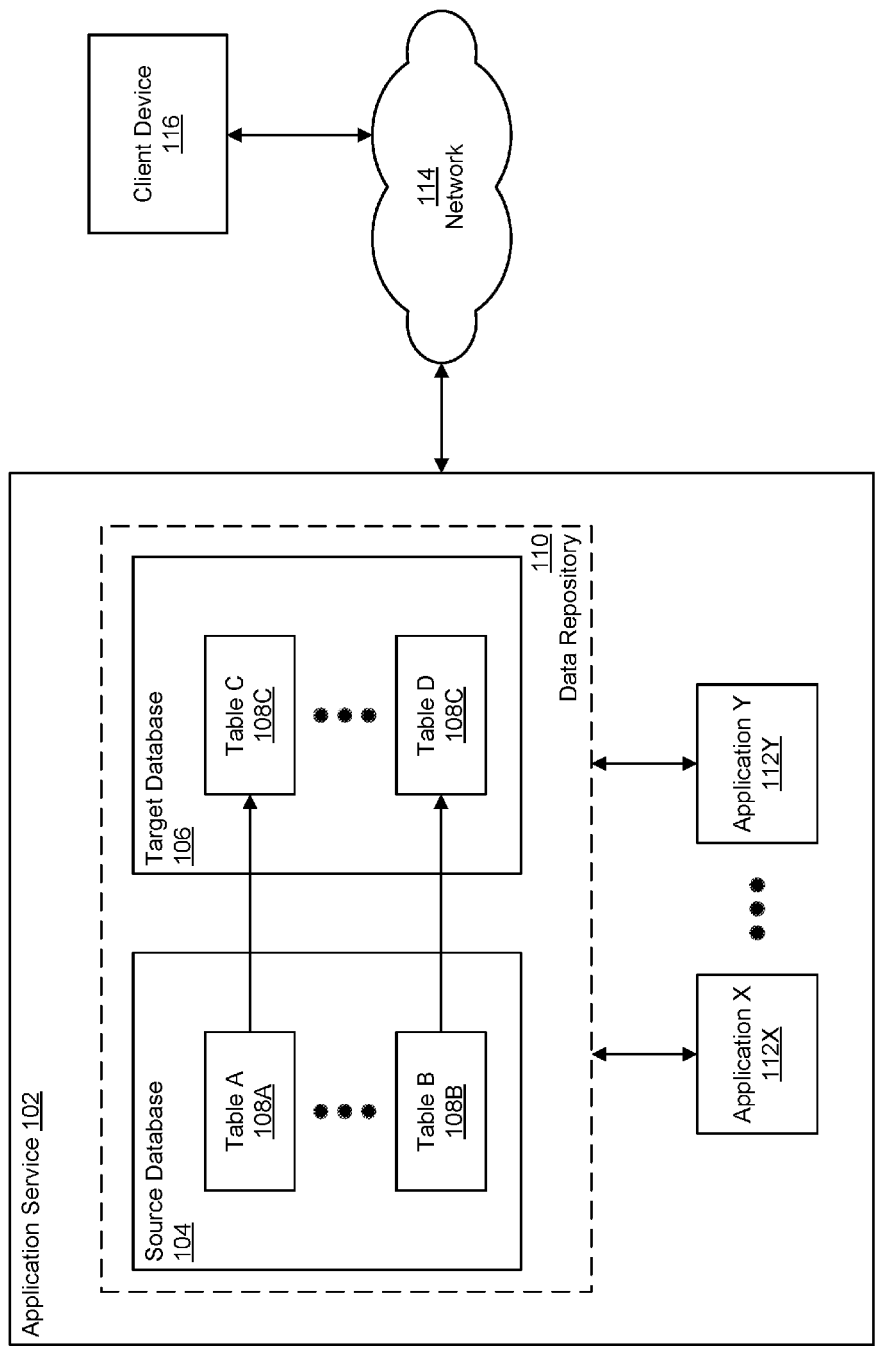
FIG. 1 shows an example system in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to migrating tables from one or more database(s) to one or more other database(s). More specifically, in one or more embodiments, an application service determines that one or more tables are to be migrated and initiates a migration process. In one or more embodiments, the application service may migrate tables in a particular order based on one or more factors. Examples of factors that the application service may take into account are write density for a period of time, read or access density for a period of time, total number of accesses for a period of time, a current state of read or write density, a number of joins over a period of time, the size of the table, and/or any other factor that may determine a table is to be migrated. Thus, in one or more embodiments of the technology, the application service migrates tables based on usage patterns and cross-database linking (e.g., join operations between table(s) in a source database and table(s) in a target database).

FIG. 1 shows an example system in accordance with one or more embodiments of the technology.

As shown in FIG. 1, the system includes one or more application services such as application service (102), a network (114), a client device (116), and one or more client devices such as client device (116). Each of these components is described below. The various computing systems shown in FIG. 1 may correspond to one or more of the computing systems shown in FIGS. 5.1 and 5.2.

In one or more embodiments of the technology, an application service (102) hosts one or more data repositories (110) and one or more applications such as Application X (112X) through Application Y (112Y). The application service (102) corresponds to hardware, software, firmware or any combination thereof that performs the functionality of the application service (102). In other words, the application service (102) may manage, store, retrieve, migrate, or perform various other operations on the data stored in the data repository (110). Specifically, in one or more embodiments, the application service (110) performs weight calculations based on various data metrics. That is, the application service (110) may include functionality to monitor and store various metrics about queries (e.g., number of writes, size of the tables, number of reads (e.g., the number of IO reads performed on the table, the read wait time for read IOs issued to the table, etc.), number of writes (e.g., the number of IO writes performed on the table, the write wait time for write IOs issued to the table, etc.) in a given period of time, number of reads in a given period of time, each operation (including operation parameters, a timestamp, etc.) performed on the table, number of operations in which the table (or a portion thereof) was joined with another table, etc.) as table metadata. Additionally, in one or more embodiments, the application service engine (110) services data migration requests from one or more client devices (116), one or more applications (112X)-(112Y), or from any other process or input capable of triggering a migration to migrate data from one database to another database. See e.g., FIG. 3. In one or more embodiments of the technology, the application service may be implemented using specialized hardware.

In one or more embodiments of the technology, the data repository (110) is any type of storage unit and/or device (e.g., a file system, database, collection of tables, or any other storage mechanism) for storing data. Further, the data repository (110) may include multiple different storage units and/or devices. The multiple different storage units and/or devices may or may not be of the same type or located at the same physical site. In one or more embodiments, the data repository (110) includes functionality to store and retrieve content for the one or more applications (112X) through (112Y). Examples of content may include, but are not limited to, employee information, user logins, credentials, text files, audio files, image files, and/or audio-visual files. Further, the data repository may also store metadata associated with the content. Examples of metadata may include, but are not limited to, author, content name, creation time, creation date, size of object, modification time, modification date, content format, e.g., portable document format (PDF), MPEG-4, .txt., etc.

In one or more embodiments, the data repository (110) may include structured or unstructured data. For example, in one or more embodiments of the technology, the data repository (110) may be one or a combination of a relational database, an object-oriented database, or a graph database. In one or more embodiments of the technology, the data repository has a source database (104) and a target database (106). As discussed above, the data repository (110) may or may not be located at the same computing system or physical location and thus, the source database (104) and target database (106) may or may not be co-located.

In one or more embodiments of the technology, the source database (104) stores one or more tables such as Table A (108A) through Table B (108B). Tables (108A)-(108B) may represent one or more forms of structured data. Specifically, in one or more embodiments of the technology, the tables may include one or more rows and one or more columns. Certain columns may be used as keys for the table or in other words, a way to uniquely identify rows of information within the table. Furthermore, one or more data values or content may be stored in each column of a particular row. The one or more data values or content within a particular row may be related to each other. Additionally or alternatively, one or more rows, columns, or data value(s) may be related to one or more rows, columns, or data value(s) stored in another table. For example, Application X (112X) may store data values in Table A (108A) related to data values in Table B (108B). Continuing with the example, Application X (112X) may query data from the data repository (110), but only request a selected subset of the data contained in Table A (108A) and/or Table B (108B). The query may return a subset of data that is a combination of the data values from Table A (108A) and Table B (108B). In one or more embodiments, the process of combining the data values from one or more tables may be a JOIN operation that combines the data values into newly generated temporary table based on the parameters set forth in the query operation. Further detail about table relationships is provided in, for example, FIGS. 2.1-2.2.

Additionally or alternatively, in one or more embodiments, the target database (106) also stores one or more tables (108C) through (108D). In one or more embodiments, the target database (106) receives and stores one or more of the tables through a migration procedure such as, for example, the migration procedure described in FIG. 3. Alternatively, in one or more embodiments, the target database (106) may be, for example, a backup of the source database (104). For example, the source database (104) may be copied or migrated to the target database (106) at periodic intervals, on a schedule, or based on one or more inputs from an administrator, client, or application (e.g. Application X (112X) or Application Y (112)).

In one or more embodiments of the technology, the application service (102) also executes one or more applications such as Application X (112X) through Application Y (112Y). Alternatively, in one or more embodiments, the applications (112X)-(112Y) may execute on one or more application services (102) distributed across more than one computing system, or the applications (112X)-(112Y) may execute on one or more client devices.

In one or more embodiments of the technology, the client device (116) may be any computing system (see e.g., FIGS. 5.1, 5.2) having functionality to execute or otherwise interact with the one or more software applications (e.g., Applications (112X)-(112Y)). The client device may execute a software application directly or indirectly such as in a web browser or other client application (not shown). A user as used herein is a user of the client device. For example, the user may be an individual using the software application via the client device. The user may be an end user, an administrator, a developer, a member of a particular domain, or any other type of identification for an individual or group of individuals.

In one or more embodiments of the technology, the client device(s) (116) may be operatively connected to the application service (102). Connection between the client device(s) (116) and the application service (102) may be via a network (114). In one or more embodiments, the network (114) may be a local area network (LAN), a wide area network (WAN) such as the Internet, telecommunications network, or any other type of network or combination of networks.

FIG. 2.1 shows example tables in accordance with one or more embodiments of the technology. More specifically, FIG. 2.1 shows an example of the relationships between various tables in a database (or across databases) in accordance with one or more embodiments of the technology.

In the example shown in FIG. 2.1 there are three tables: Table A, Table B, and Table C. Though not shown in FIG. 2.1, each table may include one or more records, where each of the records may be associated with one or more keys (e.g., a primary key and one or more foreign keys). Each of the aforementioned records may include a datum (or data).

In one or more embodiments, a user querying information from the tables may limit the query to retrieve records matching particular criteria. For example, if the table is a table of employee addresses, then the user may issue a query to identify employee addresses where the address is a location in the state of California. In this example, the result of the query may be a subset of records from the table, where each of the records includes an address that is in California.

In one or more embodiments of the technology, a table may also have related metadata (not shown). For example, metadata may include, but is not limited to, the number of accesses of particular records or keys, the number of joins amongst tables (i.e., the number of JOIN operations in which the table is listed), the types of data stored in records (e.g. integers, strings, blobs, unique ids, booleans, or any other datatypes stored in the table), a timestamp for when the data was last accessed, a timestamp for when the data was last modified, or any other types of metadata that may be used to describe the stored records.

In one or more embodiments, as shown in FIG. 2.1a graph representation of table relationships may show each table as a "vertex" and may include edges between the various vertices. The presence of an edge between two vertices indicates that the tables connected by the edge were part of any least one query in which the aforementioned tables (or portions thereof) were joined. The edges may be used to represent additional relationships between the tables (represented by vertices in the graph) without departing from the technology.

Referring to FIG. 2.2, as discussed above, in one or more embodiments of the technology, various metrics (also referred to as factors) may be calculated and/or stored for each of the vertices (i.e., tables). More specifically, for a given table (200), the following factors may be calculated and/or determined: (i) a write density factor (202), which corresponds to (or is based on) a value representing the number of write operations performed on the table (during a given period of time) divided by the size of the table (e.g., the average size of the table during the given period of time); (ii) a read density factor (204), which corresponds to (or is based on) a value representing the number of read/access operations performed on the table (during a given period of time) divided by the size of the table (e.g., the average size of the table during the given period of time); (iii) an aggregate joins factor (206), which corresponds to (or is based on) the number of operations performed on the table during a given period of time in which the table was joined with at least one other table; and (iv) a source/target DB joins factor (208), which corresponds to (or is based on) the number of operations performed on the table during a given period of time in which the table was joined with at least one other table in the target database.

In one embodiment of the technology, a table is considered to be joined to at least one other table when either of the following occurs: (i) the table was listed with at least one other table in a query and (ii) the table was listed in a query with at least one other table with a column joining the table and the at least one other table. For example, consider the following query:

Select *
From emp
Join dept using(deptno)
Join empsalary using(empid)

In this example, there may be one join operation recorded between emp and dept, one join operation recorded between emp and emp salary, and one join operation recorded between dept and empsalary. In another embodiment of the technology, the aforementioned query may result in only two join operations being records, namely, one join operation recorded between emp and dept and one join operation recorded between emp and empsalary.

Continuing with the discussion of In one embodiment of the technology, factors (i) and (ii) only take into account each table in isolation. In contrast, factors (iii) and (iv) take into account how the specific table is used with other tables in the source and/or target databases. Said another way, factors (iii) and (iv) take into account how the applications (see e.g., 112X, 112Y) are using combinations of tables. Further, factor (iv) takes into account the frequency at which applications are issuing queries where at least one table specified in the query is in the source database and at least one other table specified in the query is in the target database.

In one embodiment of the technology, factors (i) and (ii) may be determined using historical monitoring data obtained by the application service (or a process executing therein). In such cases, factors (i) and (ii) may be referred to pre-calculated factors. In one embodiment of the technology, factors (iii) and (iv) may be determined using real-time monitoring data, near-real time monitoring data, or monitoring data obtained within a relatively close period of time to when the monitoring data is to be used to calculate factors (iii) and (iv) (e.g., the monitoring data is obtained within the past 1-5 hours). In such cases, factors (iii) and (iv) may be referred to as a dynamically-calculated factors.

The following is a no-limiting example illustrating the calculation of the write density factor. Consider a scenario in which a given table has a size of 200 MB and within a particular period of time 20 write operations are performed on the table. Accordingly, in this example, the write density may be 1/10 (i.e., 20/200). The write density factor may then be determined based on the write density. For example, if migration of a given table is more favorable when the write density of the table is low, then the write density factor may be equal to 1/write density. Accordingly, in the above example, the write density factor is 20. Those skilled in the art will appreciate that the read density factor may be calculated in a similar manner. Further, those skilled in the art appreciate that the write density factor may be calculated in a different manner without departing from the technology.

Continuing with the discussion of FIG. 2.2, in one embodiment of the technology, historical monitoring data corresponds to monitoring data that is obtained months, weeks, and/or days in advance of the initiating of migration of the tables. The monitoring data (including historical monitoring data, real-time monitoring data, near-real time monitoring data, or monitoring data obtained within a relatively close to when the monitoring data is to be used to calculate factors (iii) and (iv)) may include, but is not limited to, number of writes, size of the tables, number of reads, number of writes in a given period of time, number of reads in a given period of time, each operation (including operation parameters, a timestamp, etc.) performed on the table, and number of operations in which the table (or a portion thereof) was joined with another table.

In one embodiment of the technology, factors (i)-(iv) may be combined to generate a migration factor for a table. The migration factor (MF) for a table (t) may be determined as follows: $MF(t)=C_1F_1+C_2F_2+C_3F_3+C_4F_4$, where $C_1$ through $C_4$ are constants, and $F_1$ through $F_4$ are factors (i)-(iv) (described above), respectively. The constants are used to weight each of the individual factors.

In one embodiment of the technology, the aforementioned constants are used to determine relative importance of the various factors that are used to generate the migration factor. For example, in one implementation of the technology, the most important factor that favors migration may be source/target DB joins factor while the least important factor may be the aggregation joins. Further, the lower the write density factor and the read density factor, the higher migration factor (i.e., migration is favored). Based on the above, the relative importance of the aforementioned factors for migration may be as follows: highest source/target DB joins factor >write density factor >read density factor >aggregate joins factor. The technology is not limited In one or more embodiments, the migration factor may take into account the importance (absolute or relative) of the table (i.e., security levels of the data relationship, levels of importance for retention policies, etc.). In one or more embodiments, the migration factor for a table may also change over time (See e.g., example in FIGS. 4.1-4.7).

The factors may be combined (as discussed below in FIG. 3) to generate a migration factor for a table. The migration factors of all tables that are to be migrated may then be used to select a table to migration. Additional detail about the migration of tables using the migration factors are discussed below in FIG. 3.

While the various steps in the following flowchart is presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology.

Figure 3:
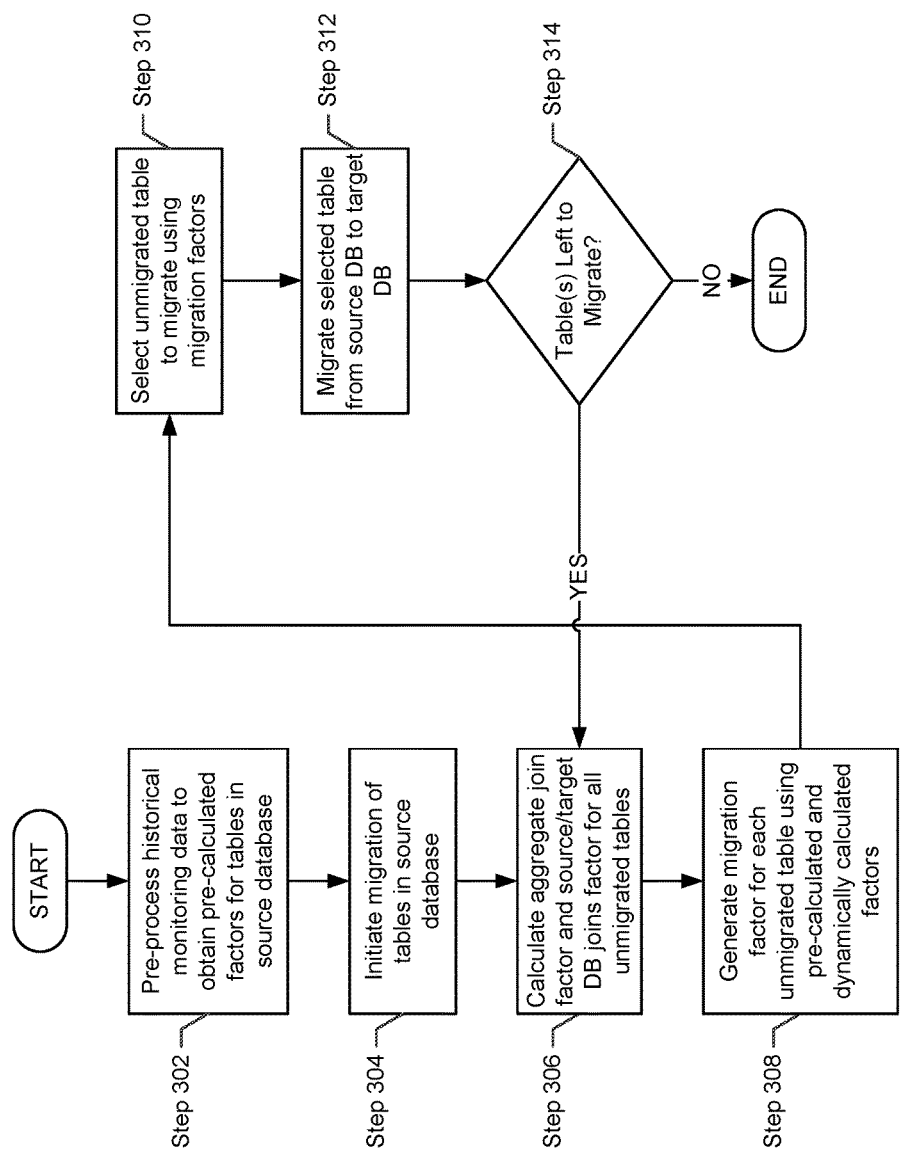
FIG. 3 shows an example method for migrating tables in accordance with one or more embodiments of the technology.

FIG. 3 shows an example method for migrating tables in accordance with one or more embodiments of the technology. The method shown in FIG. 3 may be implemented, for example, using the system shown in FIG. 1.

In Step 302, pre-process historical monitoring data to determine values for pre-calculated factors (e.g., write density factor, read density factor) for all tables in the source database. Step 302 may be performed at any time prior to step 308.

In Step 304, migration of the tables in the source database to a target database is initiated. The migration may be initiated by a user, automatically by the application service (or by a process executing therein), and/or by an external process (i.e., a process that is not executing within the application service).

In Step 306, the dynamically-calculated factors (e.g., aggregate joins and source/target DB joins factor) are calculated for each table in the source database. As discussed above, the dynamically-calculated factors may be calculated using real-time monitoring data, near-real time monitoring data, or monitoring data obtained within a relatively close period of time to when the monitoring data is to be used in step 306. As discussed above, the pre-calculated factors may have been calculated previously and, as such, do not need to calculated again in step 306.

In Step 308, a migration factor is calculated for each table in the source database (i.e., for all tables that have not been migrated to the target database). As discussed above, the migration factor may be calculated using the pre-calculated factors (see e.g., step 302) and the dynamically-calculated factors (see e.g., step 306).

In Step 310, the tables in the source database are ranked, using the migration factors calculated in step 308, in order to select a table to migrate to the target database. In one embodiment of the technology, the table with the highest migration factor is selected for migration. The table with the highest migration factor corresponds to the table that will result in the least negative performance impact (and/or the most positive performance impact) while it is being migrated and/or after it has been migrated. The performance impact may correspond to the performance impact on the applications (112X, 112Y) that are issuing queries and/or performing other actions on the table.

In Step 312, the selected table is migrated to the target database. In Step 314, a determination is made about whether there are additional tables in the source database to migrate. If so, the process proceeds to step 306; otherwise the process ends.

By performing the process in FIG. 3, the tables in the source database may be migrated to the target database, where the order of the migration is based on the migration factor. As tables are migrated, the dynamically-calculated factors may be repeatedly calculated while the pre-calculated factors are reused. Further, the migration process in FIG. 3 takes into the account the how applications are interacting with the tables pre and post migration. By taking into account how the applications are interacting with the tables during migration, the order in which the tables in the source database are selected for migration may be optimized in order to minimize performance impacts on the applications that are interacting with the tables that are part of the migration.

The following section describes various examples in accordance with one or more embodiments of the technology. The examples are not intended to limit the scope of the technology.

FIGS. 4.1-4.7 show an example in accordance with one or more embodiments of the technology.

FIG. 4.1 shows a set of tables that are to be migrated. Further, for purposes of this example, the edges between the tables represent that the tables were part of a JOIN operation. Further, the numbers listed on each of the edges shows the number of JOIN operations of which the tables were used for a given period of time. For example, table 1 and table 3 were involved in 10 Join operations during the given period of time while table 3 and table 2 were involved in 4 Join operations during the same period of time. For purposes of the following example, assume that the Joins operations in which the various tables are involved remains constant over the course of the migration of the tables from the source database to the target database.

Referring to FIG. 4.2, FIG. 4.2 shows historical monitoring data for tables 1-5. This historical monitoring data may be used, as described in step 302 above, to per-calculate write density factors and read density factors for each of the tables. For purposes of this example assume that the write density factor=1/(write density) and the read density factor=1/(read density). Further, assume that the table with the highest migration factor is selected for migration and that the migration factor is calculated using the following constants: $C_1=10$ (write density factor constant), $C_1=8$ (read density factor constant), $C_3=4$ (aggregate joins factor), and $C_1=20$ (source/target DB joins factor). In this example, the selection of the aforementioned constants indicates that the most important factor for migration is the source/target DB joins factor and the least important factor is the aggregate joins factor. Of the remaining two factors, a high write density factor (which corresponds to a low write density) is more important than a high read density factor (which corresponds to low read/access density).

Using the above information, assume that a user initiates migration (per step 304) of tables 1-5 for a source database to a target database. Once the migration is initiated, per FIG. 3, the dynamically-calculated factors are determined. In this example, the aggregate joins factor for each of the tables is shown in FIG. 4.3. As discussed above, the aggregate joins factors are determined using the information shown in FIG. 4.1. Further, FIG. 4.3 also shows the values of the write density factors and the read density factors. Because no tables have been migrated at this time, the source/target DB joins factor is zero for all tables. Using the aforementioned constants and the factors shown in FIG. 4.3, the table 2 has the highest migration factor (i.e., 348) and, as such, table 2 is migrated to the target database. Because there are additional tables remaining in the source database to migrate, the above process is repeated.

Turning to FIG. 4.4, once table 2 is migrated, the dynamically-calculated factors are re-calculated for the remaining tables in the source database. In this example, as discussed above, the aggregate joins factors may be determined using FIG. 4.1. Further, because table 2 has migrated, the source/target DB joins factor may be updated for at least tables 3-5. More specifically, as shown in FIG. 4.1, table 2 was involved in Join operations with tables 3-5 and, as such, their source/target DB joins factor is updated as shown in FIG. 4.4; however, because table 1 is not involved in any Join operations with table 2, its source/target DB joins factor remains at zero. Using the aforementioned constants and the factors shown in FIG. 4.4, the table 4 has the highest migration factor (i.e., 422) and, as such, table 4 is migrated to the target database. Because there are additional tables remaining in the source database to migrate, the above process is repeated.

Turning to FIG. 4.5, once table 4 is migrated, the dynamically-calculated factors are re-calculated for the remaining tables in the source database. In this example, as discussed above, the aggregate joins factors may be determined using FIG. 4.1. Further, because tables 2 and 4 have been migrated, the source/target DB joins factor may be updated for at least tables 3 and 5. More specifically, as shown in FIG. 4.1, tables 2 and 4 were involved in Join operations with tables 3 and 5 and, as such, their source/target DB joins factor is updated as shown in FIG. 4.5; however, because table 1 is not involved in any Join operations with table 2 or table 4, its source/target DB joins factor remains at zero. Using the aforementioned constants and the factors shown in FIG. 4.5, the table 5 has the highest migration factor (i.e., 330) and, as such, table 5 is migrated to the target database. Because there are additional tables remaining in the source database to migrate, the above process is repeated.

Turning to FIG. 4.6, once table 5 is migrated, the dynamically-calculated factors are re-calculated for the remaining tables in the source database. In this example, as discussed above, the aggregate joins factors may be determined using FIG. 4.1. Further, because tables 2 and 4-5 have been migrated, the source/target DB joins factor may be updated for at least table 3. More specifically, as shown in FIG. 4.1, table 3 was involved in Join operations with table 2 and, as such, its source/target DB joins factor is updated as shown in FIG. 4.6; however, because table 1 is not involved in any Join operations with table 2, table 4 or table 5, its source/target DB joins factor remains at zero. Using the aforementioned constants and the factors shown in FIG. 4.6, the table 3 has the highest migration factor (i.e., 226) and, as such, table 3 is migrated to the target database. Because there are additional tables remaining in the source database to migrate, the above process is repeated.

Referring to FIG. 4.7, because there is only one additional remaining table in the source database it may be selected requiring the determination of a migration factor. In this example, table 1 is selected for migration and subsequently migrated.

Embodiments of the technology may be implemented on a computing system. Any combination of mobile, desktop, server, router, switch, embedded device, or other types of hardware may be used. For example, as shown in FIG. 5.1, the computing system (500) may include one or more computer processor(s) (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device.

The communication interface (512) may include an integrated circuit for connecting the computing system to a network (not shown) (e.g., a local area network (LAN), a wide area network (WAN) such as the Internet, mobile network, or any other type of network) and/or to another device, such as another computing device.

Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The input and output device(s) may be locally or remotely connected to the computer processor(s) (502), memory (504), and storage device(s) (506). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform one or more embodiments of the technology.

The computing system (500) in FIG. 5.1 may be connected to or a part of a network. For example, as shown in FIG. 5.2, the network (520) may include multiple nodes (e.g., node X (522), node Y (524)). Each node may correspond to a computing system, such as the computing system shown in FIG. 5.1, or a group of nodes combined may correspond to the computing system shown in FIG. 5.1. By way of an example, embodiments of the technology may be implemented on a node of a distributed system that is connected to other nodes. By way of another example, embodiments of the technology may be implemented on a distributed computing system having multiple nodes, where each portion of the technology may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform all or a portion of one or more embodiments of the technology.

The computing system or group of computing systems according to FIGS. 5.1 and 5.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces, or communication channel endpoints, enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to server process. Upon receiving the data request, the server process analyzes the request and gathers the requested data. Finally, the server process then generates a reply including at least the requested data, and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment, by one process, may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the technology. The processes may be part of the same or different application, and may execute on the same or different computing system.

Rather than or in addition to sharing data between processes, the computing system performing one or more embodiments of the technology may include functionality to receive data from a user. For example, in one or more embodiments, a user may submit data via a graphical user interface on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from local memory by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system in performing one or more embodiments of the technology may extract one or more data items from the obtained data. For example, the extraction may be performed as follows by the computing system in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string, or may be a query presented to a structured data repository (where the data repository may be organized according to a database schema or data format, such as XML).

The extracted data may be used for further processing by the computing system. For example, the computing system of FIG. 5.1 while performing one or more embodiments of the technology may perform data comparison. Data comparison may be used to compare two or more data values (e.g., A, B). For example, one or more embodiments may determine whether $A>B$, $A=B$, $A\,!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate if the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the technology, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from storage and perform computations to respond to the query. The DBMS may return the result(s) to the user, or software application.

The computing system of FIG. 5.1 may include functionality to present raw and/or processed data, such as results of comparisons and other processing. For example, presenting data may be accomplished through various presenting methods. Specifically, data may be presented through a user interface provided by a computing device. The user interface may include a graphical user interface (GUI) that displays information on a display device, such as a computer monitor or a touchscreen on a handheld computer device. The graphical user interface may include various graphical user interface widgets that organize what data is shown as well as how data is presented to a user. Furthermore, the graphical user interface may present data directly to the user, e.g., data presented as actual data values through text, or rendered by the computing device into a visual representation of the data, such as through visualizing a data model.

For example, a graphical user interface may first obtain a notification from a software application requesting that a particular data object be presented within the graphical user interface. Next, the graphical user interface may determine a data object type associated with the particular data object, e.g., by obtaining data from a data attribute within the data object that identifies the data object type. Then, the graphical user interface may determine any rules designated for displaying that data object type, e.g., rules specified by a software framework for a data object class or according to any local parameters defined by the graphical user interface for presenting that data object type. Finally, the graphical user interface may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 5.1 and the nodes and/or client device in FIG. 5.2. Other functions may be performed using one or more embodiments of the technology.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for migrating tables in databases, comprising:
   calculating a first migration factor for a first table in a source database using
      a first write density factor for the first table;
      calculating a second migration factor for a second table in the source database using a second write density factor for the second table;
   calculating a third migration factor for a third table in the source database using a third write density factor for the third table;
   selecting the first table based on a first determination that the first migration factor is greater than the second migration factor and the third migration factor, wherein the first write density factor is greater than the second write density factor and the third write density factor;
   migrating, based on the first determination, the first table to a target database; and
   after migration of the first table:
      calculating a second updated migration factor for the second table using the second write density factor and a first source/target joins factor for the second table, wherein the first source/target joins factor takes into account that the first table has been migrated to the target database;
      calculating a third updated migration factor for the third table using the third write density factor and a second source/target joins factor for the second table;
      selecting the second table based on a second determination that the second updated migration factor is greater than the third updated migration factor, wherein the first source/target joins factor is greater than the second source/target joins factor; and
      migrating, based on the second determination, the second table to the target database.

2. The method of claim 1, further comprising:
   selecting the third table based on a third determination that the third updated migration factor is greater than any other migration factor; and migrating, based on the third determination, the third table to a target database.

3. The method of claim 1, further comprising:
calculating an aggregate joins factor for the first table using real-time monitoring data, wherein calculating the first migration factor further comprises using the aggregate joins factor.

4. The method of claim 1, wherein the first write density factor is determined using historical monitoring data.

5. The method of claim 1, further comprising:
calculating a read density factor for the first table, wherein calculating the first migration factor further comprises using the read density factor.

6. A system comprising:
an application service; and
a data repository, comprising a source database and a target database,
wherein the application service is configured to:
  calculate a first migration factor for a first table in the source database using
  a first write density factor for the first table
  calculate a second migration factor for a second table in the source database using a second write density factor for the second table;
  calculate a third migration factor for a third table in the source database using a third write density factor for the third table;
  select the first table based on a first determination that the first migration factor is greater than the second migration factor and the third migration factor, wherein the first write density factor is greater than the second write density factor and the third write density factor;
  migrate, based on the first determination, the first table to the target database; and
  after migration of the first table:
    calculate a second updated migration factor for the second table using the second write density factor and a first source/target joins factor for the second table, wherein the first source/target joins factor takes into account that the first table has been migrated to the target database;
    calculate a third updated migration factor for the third table using the third write density factor and a second source/target joins factor for the second table;
    select the second table based on a second determination that the second updated migration factor is greater than the third updated migration factor, wherein the first source/target joins factor is greater than the second source/target joins factor; and
    migrate, based on the second determination, the second table to the target database.

7. The system of claim 6, wherein the application service is further configured to:
select the third table based on a third determination that the third updated migration factor is greater than any other migration factor; and migrate, based on the third determination, the third table to a target database.

8. The system of claim 6, further comprising:
calculating a read density factor for the first table, wherein calculating the first migration factor further comprises using the read density factor.

9. A non-transitory computer readable medium comprising instructions for performing a method, the method comprising:
calculating a first migration factor for a first table in a source database using
a first write density factor for the first table;
calculating a second migration factor for a second table in the source database using a second write density factor for the second table;
calculating a third migration factor for a third table in the source database using a third write density factor for the third table;
selecting the first table based on a first determination that the first migration factor is greater than the second migration factor and the third migration factor, wherein the first write density factor is greater than the second write density factor and the third write density factor;
migrating, based on the first determination, the first table to a target database; and
after migration of the first table:
  calculating a second updated migration factor for the second table using the second write density factor and a first source/target joins factor for the second table, wherein the first source/target joins factor takes into account that the first table has been migrated to the target database;
  calculating a third updated migration factor for the third table using the third write density factor and a second source/target joins factor for the second table;
  selecting the second table based on a second determination that the second updated migration factor is greater than the third updated migration factor, wherein the first source/target joins factor is greater than the second source/target joins factor; and
  migrating, based on the second determination, the second table to the target database.

10. The non-transitory computer readable medium of claim 9, wherein the method further comprises:
selecting the third table based on a third determination that the third updated migration factor is greater than any other migration factor; and
migrating, based on the third determination, the third table to a target database.

11. The non-transitory computer readable medium of claim 9, further comprising:
calculating an aggregate joins factor for the first table using real-time monitoring data wherein calculating the first migration factor further comprises using the aggregate joins factor.

12. The non-transitory computer readable medium of claim 9, wherein the first write density factor is determined using historical monitoring data.

* * * * *